unplasticized, oriented polyvinyl chloride film base primer coat film base pressure sensitive adhesive primer coat film base of unplasticized, oriented polyvinyl chloride Joseph J. Screnock
James L. Forse
INVENTOR.

United States Patent Office 3,152,004
Patented Oct. 6, 1964

3,152,004
PRESSURE-SENSITIVE ADHESIVE TAPE HAVING BI-AXIALLY ORIENTED, UNPLASTICIZED POLYVINYL CHLORIDE FILM BASE
Joseph J. Screnock, Deerfield, and James L. Forse, Arlington Heights, Ill., assignors to Mystik Tape, Inc., a corporation of Illinois
Filed Sept. 20, 1957, Ser. No. 685,182
4 Claims. (Cl. 117—76)

This invention relates to the manufacture of a pressure-sensitive, film type adhesive tape and it relates more particularly to an improved pressure-sensitive adhesive tape and materials and methods for the manufacture of same.

To the present, pressure-sensitive adhesive tapes have been fabricated with various type materials as the base for the pressure-sensitive adhesive coating. Cellophane has been used as the base in tapes to be employed for wrapping and the like. Plasticized polyvinyl chloride has been used as the base in the manufacture of a stretchable, electrical insulation tape adapted to be wound about metal conductors. Plain and creped paper has been used in the preparation of masking tapes and cloth has been used as the base in the manufacture of general purpose, high strength tapes for decorative purposes.

The described base materials are each limited in the applications which can be made because of the specific properties of the various materials and each is in some way deficient in desirable properties even in its limited field of application. For example, cellophane, because of its hydroscopic character, picks up moisture upon exposure to high humidity to the extent that the base material becomes limp and subject to changes in phyiscal properties and dimensional properties such as elongation and thickness. At low relative humidity, the cellophane base looses moisture to the extent that the base material becomes embrittled. These characteristics lead on the one hand to roll deformation, generally referred to as "telescoping" or "spoking," or breakage of the tape upon removal from the roll. The dried film is difficult to remove in one piece from the wound roll of tape.

The stretchable tapes formed of a plasticized polyvinyl chloride run into difficulties because of the tendency for the plasticizer to migrate from the plasticized film material to the pressure-sensitive adhesive coating with the result that loss in the tack or adhesiveness is experienced. Various attempts have been made to avoid detackification resulting from the migration of plasticizer by the use of a combination of plasticizers including a limited amount of liquid plasticizer such as dioctyl phthalate in combination with additional amounts of resinous types of plasticizers which are incapable of migration but capable of providing flexibility and stretchability to the film plastic. While some improvements are achieved by the described modification, deficiencies are still experienced from the standpoint of loss in tackiness and the materials employed remain relatively costly.

Flat and creped paper tapes are subject to splitting or delamination, as is well known to those skilled in the art. Attempts have been made to strengthen the paper and to minimize delamination by the use of saturants internally to bond the paper fibers one to another in the base sheet. Attempts have been made also in the use of a release coating on the paper to enhance the removal of the tape from the roll without causing splitting or delamination. Such steps to strengthen the paper and to ease separation of the tape from the roll have provided improvements but many of the difficulties still remain. Cloth tapes are expensive and thus limited in application and use.

It is an object of this invention to produce and to provide a method and materials for producing a pressure-sensitive adhesive tape which can be employed in applications heretofore requiring the use of a cellophane tape, or a stretchable electrical tape or a creped paper tape or a cloth tape and which embodies the desirable characteristics of the various tapes while avoiding many of the deficiencies thereof.

More specifically, it is an object of this invention to produce a pressure-sensitive tape which is formed with a plastic film base that is relatively unaffected by moisture or humidity and which does not become embrittled at low relative humidity; which is readily stretched in various directions to enable wrapping about conductors and the like or otherwise conformed to the contour of surfaces to be covered without limitation as to the type of pressure-sensitive adhesive employed or loss of tackiness in the adhesive; which is not subject to the splitting or delamination characteristics of flat or creped paper base materials; which is formed of readily available and relatively inexpensive materials to provide a low cost tape; which provides for a strong bonded relationship between the pressure-sensitive adhesive layer and the base material to minimize separation while also permitting the tape to be unwound from the roll without splitting or delamination.

These and other objects and advantages of this invention will hereinafter appear and for purposes of illustration, but not of limitation, an embodiment of the invention is shown in the accompanying drawing in which—

Figure 1:
FIG. 1 is a schematic sectional elevational view through a portion of the base material.
Figure 2:
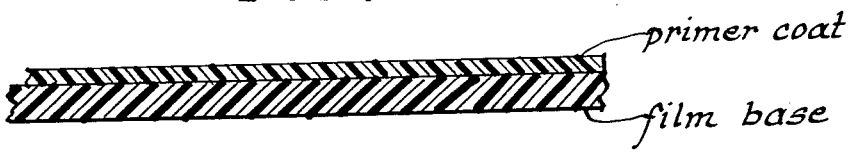
FIG. 2 is a schematic sectional elevational view showing a portion of the base material with the primer coating thereon.
Figure 3:
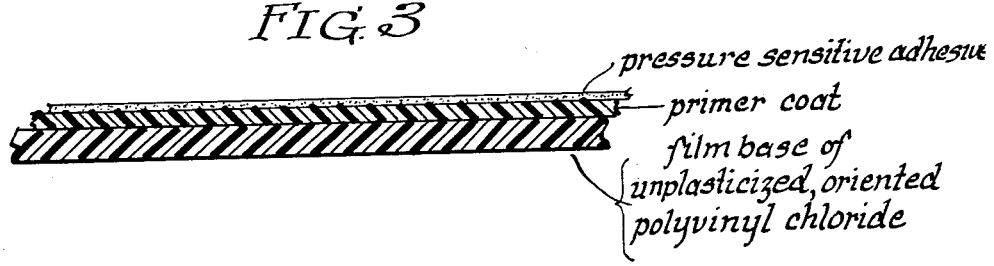
FIG. 3 is a schematic sectional elevational view of the completed pressure-sensitive adhesive tape.

In accordance with the practice of this invention the described improvements are achieved by the fabrication of a tape with a base formed of an unplasticized polyvinyl chloride resin in which the molecules of the polyvinyl chloride resin are oriented in the crosswise and lengthwise directions as by stretching the film in the lengthwise and crosswise directions by means well known in the art. It has been found that the orientation of the molecules in the thin film of polyvinyl chloride resin provides for a flexibility and stretchability which is incapable of being achieved by such unplasticized resinous materials without the described orientation or with orientation only in one direction. The ability to achieve high flexibility and stretchability without the necessity to include a large amount of plasticizer, as heretofore required in the manufacture of a stretchable electrical insulation tape, has enabled the manufacture of a pressure-sensitive adhesive tape with various of the conventional types of pressure-sensitive adhesives without loss of tackiness and adhesiveness in use.

The unplasticized polyvinyl chloride film oriented in the crosswise and lengthwise directions in the tape has been found not only to provide a large degree of flexibility and stretchability but, by reason of the absence of plasticizers and the modifiers, the base materials can be formulated free of odor or taste, thus enabling use of the tapes in applications heretofore foreclosed to the field of pressure-sensitive materials. The unplasticized polyvinyl chloride film has been found to be highly resistant to moisture so as to be relatively unaffected by either high humidity or low humidity which have heretofore induced limpiness and embrittlement respectively in cellophane tapes. The unplasticized polyvinyl chloride film base of the type employed in combination with the pressure-sensitive adhesives has also been found to have excellent electrical insulation properties for enabling use as a stretchable electrical adhesive tape without the limitations heretofore experienced with the pressure-sensitive adhesive tapes formed with a stretchable plasticized polyvinyl chloride film. Tapes embodying the features of this invention can be formed either clear or pigmented or dyed to provide various color combinations and to provide an attractive tape having the appearance and strength properties heretofore characteristic only of the cloth tapes. Because of the absence of plasticizer or modifier, use can be made of a wide variety of pressure-sensitive adhesives without concern with respect to the higher amount of plasticizer which would otherwise be present as employed in films used as base materials.

In addition to the foregoing, the film base of the type described embodies high strength properties and flexibilities enabling use for applications heretofore limited to cellophane, creped paper, plasticized polyvinyl chloride films and cloth, thereby to provide a single tape capable of use in the many applications heretofore requiring the availability of separate tapes thereby materially to reduce inventories while at the same time reducing cost of materials and manufacture.

An unplasticized polyvinyl chloride film of about 0.5 to 20.0 mil thickness can be employed as the base for the pressure-sensitive adhesive but it is preferred to make use of an oriented unplasticized film of polyvinyl chloride having a thickness within the range of 1 to 5 mils. A film having the thickness described and oriented in both directions has the strength and integrity to function as a suitable base for the pressure-sensitive adhesive materials and it has the flexibility and stretchability for wrapping tightly about conductors and various shapes thereby to provide in one element the characteristics for which cloth and plasticized polyvinyl chloride resins have been used separately in tape manufacture. While not equivalent, improvements of the character described can be secured by the use of a base material formed by other unplasticized, film forming, high polymeric resinous materials capable of molecular orientation by stretching while cold or warm in the lengthwise and crosswise directions.

A number of difficulties have been found to arise in the fabrication of the pressure-sensitive adhesive tape embodying the film base of the type described because of the high flexibility and stretchability of the resinous film, because of the difficulty in establishing a suitable strong bonding relationship between the pressure-sensitive adhesive and the film base, and because of the effect of temperature in excess of 170° F. on the thin oriented film of unplasticized polyvinyl chloride whereby elevated temperature in excess of 150° F. to 170° F. cannot be employed to facilitate the fabrication of the pressure-sensitive adhesive tape. Use of temperatures in excess of about 150° F. in processing and use so softens the resinous materials as to enable the plastic to return toward its original condition thereby to destroy the desirable properties of the plastic and to make it unusable as a base. The high flexibility and stretchability of the thin film of plastic makes it difficult to apply the pressure-sensitive adhesive as a coating on the film base without causing such deformation or stretching as would lead to distortion of the tape in the roll or in use. The combination of stretchability and flexibility coupled with the temperature limitation imposes further problems with respect to the ability to apply the pressure-sensitive adhesive materials without the development of such loads as would lead to distortions in the final product. Thus a further concept of this invention resides in the materials employed in combination with the unplasticized film of polyvinyl chloride and the method for the application of same in the preparation of the pressure-sensitive adhesive tape.

An important concept of this invention resides in the means for enhancing the bonding relationship between the pressure-sensitive adhesive layer and underlying base of the thin film of unplasticized and oriented polyvinyl chloride resin. For this purpose, use is made of an anchoring agent embodying elements for increasing the bonding relationship, on the one side, with the surface of the film base, and, on the other side, with the pressure-sensitive adhesive thereby to tie in the adhesive layer with the film base in the manufacture of a composite structure.

Various materials in combination were formulated in the attempts to achieve the desired interbonded relationship between the adhesive and the film base. One combination which made use of a butadiene-acrylonitrile copolymer in combination with a tackifying resin and a solvent combination of toluene and methyl ethyl ketone gave a desirable priming action for enhancing the bonding relationship but the primer was deficient from the standpoint of shock transfer, identified as adhesive transfer, upon removal of the tape from a surface or from a roll.

The deficiencies from the standpoint of shock transfer have been minimized without deterioration of the efficiency of the primer when the primer coating is formulated of a combination of a butadiene-acrylonitrile copolymer and a butadiene-styrene copolymer and a tackifying resin wherein the materials are present in the ratio of about 95 parts by weight of the butadiene-acrylonitrile copolymer and 5 parts by weight of butadiene-styrene copolymer to 45 parts by weight of butadiene-acrylonitrile copolymer and 55 parts by weight of butadiene-styrene copolymer and wherein the tackifying resin is present in the ratio of 35 to 100 parts by weight of tackifying resin to 100 parts by weight of the elastomer when calculated on a solids basis. As the tackifier, use can be made of the indene-coumarone resins. Instead, use can be made of such tackifying resins as phenol formaldehyde, pinene, resins including polybeta pinene, coumarone resins, rosins, hydrogenated rosins and rosin esters, alkyd resins, polyisobutylenes, ester gums and the like employed alone or in combination and added to the elastomeric materials to enhance the bonding relationship and the characteristics of the primer coating in application and use.

The following are representative formulations which can be employed as the primers in the fabrication of a pressure-sensitive adhesive tape using the unplasticized and oriented film of polyvinyl chloride as the base.

*Example 1*

| | Parts by weight |
|---|---|
| Butadiene-acrylonitrile copolymer (Hycar 1042) | 70 |
| Butadiene-styrene copolymer (GR–S 1022) | 30 |
| Indene-coumarone resin (Piccoumaran 450–L) | 75 |
| Alkylated polyhydroxy phenol (Santovar A) | 1 |
| Toluene | 400 |
| Methyl ethyl ketone | 50 |

*Example 2*

| | |
|---|---|
| Butadiene-acrylonitrile copolymer (Hycar 1042) | 70 |
| Butadiene-styrene copolymer (GR–S 1022) | 30 |
| Indene-coumarone resin (Piccoumaran 450–L) | 35 |
| Alkylated polyhydroxy phenol (Santovar A) | 1 |
| Toluene | 400 |
| Methyl ethyl ketone | 50 |

*Example 3*

| | |
|---|---|
| Butadiene-acrylonitrile copolymer (Hycar 1042) | 70 |
| Butadiene-styrene copolymer (GR–S 1022) | 30 |
| Indene-coumarone resin (Piccoumaran 450–L) | 100 |
| Alkylated polyhydroxy phenol (Santovar A) | 1 |
| Toluene | 400 |
| Methyl ethyl ketone | 50 |

*Example 4*

| | |
|---|---|
| Butadiene-acrylonitrile copolymer (Hycar 1042) | 60 |
| Butadiene-styrene copolymer (GR–S 1022) | 40 |
| Indene-coumarone resin (Piccoumaran 450–L) | 75 |
| Alkylated polyhydroxy phenol (Santovar A) | 1 |
| Toluene | 400 |
| Methyl ethyl ketone | 50 |

Example 5

| | Parts by weight |
|---|---|
| Butadiene-acrylonitrile copolymer (Hycar 1042) | 50 |
| Butadiene-styrene copolymer (GR–S 1022) | 50 |
| Indene-coumarone resin (Piccoumaran 450–L) | 75 |
| Alkylated polyhydroxy phenol (Santovar A) | 1 |
| Toluene | 400 |
| Methyl ethyl ketone | 50 |

Example 6

| | |
|---|---|
| Butadiene-acrylonitrile copolymer (Hycar 1042) | 100 |
| Alkylated polyhydroxy phenol (Santovar A) | 1 |
| Phenol formaldehyde resin (Durez Resin 12687) | 40 |
| Methyl ethyl ketone | 260 |
| Heptane | 60 |

When use is made of the solvent combination of toluene and methyl ethyl ketone the ratio of toluene and methyl ethyl ketone may range from 350 to 400 parts by weight of toluene to 50 to 100 parts by weight of methyl ethyl ketone. Other suitable solvent systems may be employed without departing from the spirit of the invention and such suitable solvent combinations may be selected by those skilled in the art. The solvent system is greatly improved, at least from the standpoint of greater anchorage of the coating, by the presence of tetrahydrofuran when used in amounts of about 2 to 10 percent of the solvent system.

The foregoing are merely representative of a preferred solvent and solids system. Other solvents, elastomers and tackifying resins may be employed, as represented by the following. The equivalent primers can be formulated in a water base system using latices for the elastomers.

Example 7

| | Parts by weight |
|---|---|
| Butadiene-acrylonitrile copolymer | 70 |
| Butadiene-styrene copolymer | 30 |
| Polyterpene (S–115) | 75 |
| Tetrahydrofuran | 2 |
| Methyl ethyl ketone | 100 |
| Alkylated polyhydroxy phenol | 1 |

Example 8

| | |
|---|---|
| Butadiene-acrylonitrile copolymer | 60 |
| Butadiene-styrene copolymer | 40 |
| Pinene resin | 35 |
| Tetrahydrofuran | 10 |
| Toluene | 375 |
| Methyl ethyl ketone | 75 |

The solids content of the primer can be varied fairly widely depending upon the method of application and the materials and solvents employed. Ordinarily, as in a knife coating process or a roller coating process, it is desirable to make use of a composition having solids sufficient to provide a coating weight within the range of .5 to 10 pounds per ream in a single coating application, although more than one coating may be applied to achieve the desired coating weight. While up to 20 pounds per ream can be employed, it is preferred to make use of coating weights within the range of 5 to 7 pounds per ream for the primer. In application, the primer composition is spread over the surface of the film and allowed to air dry. Drying can be accelerated by the use of heat as in an air drying oven or from banks of infra-red ray lamps and the like, but the temperature of drying should not be allowed to exceed 150° F. It has been found further that the bonding relationship as between the primer coat and the film base and between the primer coat and the adhesive coating subsequently to be applied can be materially improved when the base film is maintained at an elevated temperature during application of the coatings and subsequent treatment but, in such event, the temperature should not be allowed to exceed about 150° F.

Tests preformed on the primers of the foregoing examples as applied on unplasticized and oriented polyvinyl chloride film bases gave the following results as measured during a slow pull from an adhesive to 180° angle of removal at 76° F., 36° F. and upon rapid removal at 36° F. using a conventional pressure-sensitive adhesive as the coating:

| | Ex. 1 | Ex. 2 | Ex. 3 | Ex. 4 | Ex. 5 |
|---|---|---|---|---|---|
| 180° slow pull-off "adhesive to adhesive": | | | | | |
| Percent transfer at 76° F.— Blue adhesive | 43 | 55 | 55 | 35 | 40 |
| Percent transfer at 36° F.— Blue adhesive | 5 | 17 | 8 | 20 | 80 |
| Rapid removal from backing at 36° F. (percent adhesive transfer): | | | | | |
| Blue adhesive | 5 | 5 | 90 | 0 | 0 |

Rubber base pressure-sensitive adhesive capable of use in the manufacture of pressure-sensitive adhesive tapes are well known. In general, such compositions can be formulated of a synthetic or natural rubber modified with a tackifier resin of the type previously described and wherein the latter is present within the range of 50 to 100 parts by weight of tackifying resin per 100 parts by weight of rubber. The following is representative of pressure-sensitive adhesive coating compositions which have been developed for particular use in combination with a film base of the type embodying the features of this invention having a primer coating of the type described:

Example 9

| | Parts by weight |
|---|---|
| Pale crepe rubber | 100 |
| Polybeta pinene (melting point 115° C.) (Picco S–115) | 75 |
| Alkylated polyhydroxy phenol (Santovar A) | 1 |
| Heptane | 650 |

Example 10

| | |
|---|---|
| Pale crepe rubber | 100 |
| Polybeta pinene (melting point 115° C.) (Picco S–115) | 50 |
| Alkylated polyhydroxy phenol (Santovar A) | 1 |
| Heptane | 645 |

It has been found that the plasticity of the adhesive coating can be enhanced by the modification to add a butadienestyrene copolymer and/or a hydrogenated rosin to the rubber base system of the type described. The butadiene-styrene copolymer can be incorporated in an amount to constitute up to 80 percent by weight of the rubber component. The hydrogenated rosin (Staybelite Ester #10) can range from 0 to 75 parts by weight per 100 parts by weight of the rubber. The tackifying resin can be present in amounts ranging from 25 to 75 parts by weight per 100 parts by weight of the rubber.

The following are examples of clear and colored pressure-sensitive adhesive coatings which are preferably employed in the practice of this invention:

Example 11

| | Parts by weight |
|---|---|
| Pale crepe rubber | 80 |
| Butadiene-styrene copolymer (GR–S 1022) | 20 |
| Polybeta pinene (Piccolyte S–115) | 60 |
| Alkylated polyhydroxy phenol | 1 |
| Hydrogenated rosin (melting point 84° C.) | 30 |
| Titanium dioxide | 25 |
| Heptane | 645 |

Example 12

| | |
|---|---|
| Pale crepe rubber | 80 |
| Butadiene-styrene copolymer (GR–S 1022) | 20 |
| Tackifying resin | 60 |
| Hydrogenated rosin (Staybelite Ester #10) | 5 |
| Titanium dioxide | 25 |
| Solvent | 650 |

Example 13

| | Parts by weight |
|---|---|
| Pale crepe rubber | 70 |
| Butadiene-styrene copolymer (BR–S 1022) | 30 |
| Polybeta pinene (Picco S–115) | 40 |
| Hydrogenated rosin (Staybelite Ester #10) | 15 |
| Alkylated polyhydroxy phenol | 1 |
| Heptane | 650 |

Example 14

| | |
|---|---|
| Pale crepe rubber | 80 |
| Butadiene-styrene copolymer (GR–S 1022) | 20 |
| Polybeta pinene (Picco S–115) | 60 |
| Hydrogenated rosin (Staybelite Ester #10) | 10 |
| Monastral Blue dye (E. I. du Pont) | 1.96 |
| Titanium dioxide | 40 |
| Solvent | 650 |

Example 15

| | |
|---|---|
| Pale crepe rubber | 80 |
| Butadiene-styrene copolymer (GR–S 1022) | 20 |
| Polybeta pinene (Picco S–115) | 60 |
| Hydrogenated rosin (Staybelite Ester #10) | 10 |
| Watchung Red (E. I. du Pont) | 4 |
| Watchung Red Light (E. I. du Pont) | 24.4 |
| Titanium dioxide | 6.6 |
| Solvent | 650 |

Example 16

| | |
|---|---|
| Pale crepe rubber | 80 |
| Butadiene-styrene copolymer (GR–S 1022) | 20 |
| Polybeta pinene (Picco S–115) | 60 |
| Hydrogenated rosin (Staybelite Ester #10) | 10 |
| Carbon black | 11.1 |
| Heptane | 645 |

The processing conditions for applying and drying the primer and the adhesive coating should be maintained to provide a minimum tension to the web. In application, the temperature of the film base should be held below 150° F. to minimize film distortion. Application of the pressure-sensitive coating composition can be made by conventional roller coating, spray coating, knife coating or brush coating processes. The coating material may be applied onto the surface to provide coating weights of less than 40 pounds per ream and preferably within the range of 5 to 10 pounds per ream. Heating to accelerate drying can be achieved by hot air, infra-red heaters or by the use of a drum type heater but without exceeding the temperature of 150° F. Instead of using heat to prepare the surface of the film for better anchorage of the primer and pressure-sensitive adhesive coating, the solvent systems selected both for the primer and for the pressure-sensitive adhesive coating may be modified to include components which will tend to soften the surface or to etch the surface of the film to provide a better base for anchorage.

Since the thin film of oriented plasticized polyvinyl chloride stretches easily, the block rolls should be wound on a full core and then cut on a lathe into the required roll widths or else slit on a standard slitting machine. It necessitates winding of the coated tape on each core to the finished width with nearly zero tension to minimize roll distortion. Stretching during winding will invariably result in a tape which tends to return to its original length thus causing stresses within the roll which will result in distortions.

While description has been made in detail with reference to the formulations of primers and adhesive compositions best suited for use with a film base of the type embodying the features of this invention, it will be understood that a universal tape embodying the described components can be fabricated by the combination of an unplasticized crosswise and lengthwise oriented polyvinyl chloride film base coated with conventional pressure-sensitive adhesives formulated with a rubber base selected of such polymers and copolymers as butadiene-styrene, isobutylene-isoprene, butadiene-acrylonitrile, chloroprene, reclaimed rubber, polyvinyl ether, silicones and polyisobutylene, and such as are described in Patents No. 2,177,627, No. 2,236,576, No. 2,251,273, No. 2,410,078, No. 2,410,079, No. 2,453,258, No. 2,458,166, No. 2,548,980 and No. 2,561,064.

Tapes prepared in accordance with the practice of this invention combine the desirable characteristics of a cellophane tape, a plasticized polyvinyl chloride tape, a creped paper tape and a cloth tape without including undesirable features of any one. In the packaging field the tapes will be found to have better conformability, moisture-proofness, higher impact strength and etching properties by comparison with conventional film tapes such as have heretofore been manufactured of a cellophane base. A tape embodying the practices of this invention will be found capable of use for wrapping packages for the cold storage of foods since the tape is capable of being tightly stretched about the package and since the materials present in the tape are odorless and tasteless.

In the electrical insulation field, the oriented unplasticized film tape eliminates the detrimental effects heretofore experienced in the migration of plasticizer from the film base to the adhesive when use is made of a plasticized polyvinyl chloride film base.

The ability to stretch the pressure-sensitive adhesive tape about various contours enables use of tapes embodying the features of this invention instead of masking tapes for covering curved surfaces and to give sharp edge-line results in the bending of surfaces. In addition to providing the characteristics heretofore found desirable in a masking tape, it will be found that a tape embodying the features of this invention can be easily unwound from rolls without adhesive separation or delamination.

Coloring components can be embodied either in the film base or in the adhesive coating or both to provide an attractive tape capable of use in many applications heretofore limited to cloth tapes.

It will be understood that invention resides in the new and improved pressure-sensitive adhesive tape embodying the stretchable and flexible unplasticized film of oriented polyvinyl chloride resin as well as in tapes formed of such film base in combination with primers and coatings of the type heretofore described as most suitable for use therewith.

It will be further understood that changes may be made in the details of the formulations and materials employed therein and in the methods of applications thereof without departing from the spirit of the invention, especially as defined in the following claims.

We claim:

1. A pressure-sensitive adhesive tape comprising a film base having a thickness within the range of 0.5 to 20 mils and formed of an unplasticized polyvinyl chloride resin which is oriented in a lengthwise and crosswise direction, a layer of a pressure-sensitive adhesive material on the film base, and a primer coating interposed between the pressure-sensitive adhesive and the film base to anchor the pressure-sensitive adhesive onto the film base and in which the primer coating is formed of the combination of a butadiene-acrylonitrile copolymer and butadiene-styrene copolymer present in the ratio of 95 to 45 parts by weight of the butadiene-acrylonitrile copolymer to 55 to 5 parts by weight of the butadiene-styrene copolymer, said unplasticized polyvinyl chloride resin film having been oriented prior to the application of the primer coating and pressure-sensitive adhesive material thereto.

2. A pressure-senstive adhesive tape comprising a film base having a thickness within the range of 0.5 to 20 mils and formed of an unplasticized polyvinyl chloride resin which is oriented in a lengthwise and crosswise direction, a layer of pressure-sensitive adhesive material on the film base, and a primer coating interposed between the pressure-sensitive adhesive and the film base to anchor the pressure-sensitive adhesive onto the film base and in which the primer coating comprises the combination of a butadiene-styrene copolymer, a butadiene-acrylonitrile copolymer and a tackifying resin in which the tackifying resin is present in the ratio of 35 to 100 parts by weight of tackifying resin to 100 parts by weight of the elastomers, said unplasticized polyvinyl chloride resin film having been oriented prior to the application of the primer coating and pressure-sensitive adhesive material thereto.

3. A pressure-sensitive adhesive tape comprising a film base having a thickness within the range of 0.5 to 20 mils and formed of an unplasticized polyvinyl chloride resin which is oriented in at least two directions, a primer coating on the surface of the film base formed of the combination of a butadiene-styrene copolymer, a butadiene-acrylonitrile copolymer and a tackifying resin in which the materials are present in the ratio of 50 to 70 parts by weight of butadiene-acrylonitrile copolymer to 50 to 30 parts by weight of the butadiene-styrene copolymer and in which the tackifying resin is present in the range of 35 to 100 parts by weight of the tackifying resin to 100 parts by weight of the copolymers, and a layer of a pressure-sensitive adhesive on the surface of the primer coating in which the pressure-sensitive adhesive is formed of a rubber base selected from the group consisting of butadiene-styrene copolymer, isobutylene-isoprene copolymer, butadiene-acrylonitrile copolymer, polychloroprene, reclaimed rubber, natural rubber, polyvinyl ether, silicons and polyisobutylene, said unplasticized polyvinyl chloride resin film having been oriented prior to the application of the primer coating and pressure-sensitive adhesive material thereto.

4. A pressure-sensitive adhesive tape as claimed in claim 3 in which the adhesive is formed of a crepe rubber base containing up to 30 percent by weight of butadiene-styrene copolymer.

References Cited in the file of this patent

UNITED STATES PATENTS

| | | |
|---|---|---|
| 2,067,025 | Schmidt | Jan. 5, 1937 |
| 2,239,780 | Fikentscher et al. | Apr. 29, 1941 |
| 2,491,923 | Johnson | Dec. 20, 1949 |
| 2,554,791 | Nickerson | May 29, 1951 |
| 2,627,088 | Alles et al. | Feb. 3, 1953 |
| 2,647,843 | Bemmels | Aug. 4, 1953 |
| 2,812,550 | Chavannes | Nov. 12, 1957 |
| 2,819,180 | Koenig | Jan. 7, 1958 |
| 2,829,069 | Michel | Apr. 1, 1958 |